US007358683B2

United States Patent
LaGrave et al.

(10) Patent No.: US 7,358,683 B2
(45) Date of Patent: Apr. 15, 2008

(54) AUTOMATIC PWM CONTROLLED DRIVER CIRCUIT AND METHOD

(75) Inventors: Christopher Brian LaGrave, Madison, AL (US); Raymond Joseph Notarantonio, Novi, MI (US); Robert Carl Beier, St. Clair, MI (US)

(73) Assignee: Infineon Technologies AG, Munich (DE)

( * ) Notice: Subject to any disclaimer, the term of this patent is extended or adjusted under 35 U.S.C. 154(b) by 51 days.

(21) Appl. No.: 11/257,814

(22) Filed: Oct. 25, 2005

(65) Prior Publication Data

US 2007/0090766 A1    Apr. 26, 2007

(51) Int. Cl.
*H05B 41/16* (2006.01)
(52) U.S. Cl. ............... 315/247; 315/246; 315/224; 315/307; 315/291
(58) Field of Classification Search ........... 315/247, 315/246, 224, 291, 307, 225
See application file for complete search history.

(56) References Cited

U.S. PATENT DOCUMENTS

| 4,237,405 | A | * | 12/1980 | Kellis ................. 315/307 |
| 4,849,683 | A | * | 7/1989 | Flolid ................. 323/284 |
| 5,001,398 | A | * | 3/1991 | Dunn ................... 315/77 |
| 5,734,205 | A | | 3/1998 | Okamura et al. |
| 6,147,848 | A | | 11/2000 | Boggs et al. |
| 6,317,458 | B1 | | 11/2001 | Boggs et al. |
| 6,906,467 | B2 | | 6/2005 | Stam et al. |
| 2002/0158590 | A1 | * | 10/2002 | Saito et al. ........... 315/291 |
| 2004/0027105 | A1 | | 2/2004 | Nakamura et al. |
| 2005/0040880 | A1 | | 2/2005 | Plojhar et al. |
| 2005/0280375 | A1 | * | 12/2005 | Chikugawa et al. ...... 315/291 |

FOREIGN PATENT DOCUMENTS

| EP | 0 502 273 B1 | 10/2001 |
| EP | 1 520 749 A2 | 4/2005 |
| WO | WO 98/32313 A1 | 7/1998 |

OTHER PUBLICATIONS

Freescale Semiconductor, Inc. Motorola Semiconductor Technical Data, "Advance Information, Automotive Dual High Side Driver", MC33286, © Motorola, Inc., 2001, 8 pgs.

* cited by examiner

*Primary Examiner*—Tuyet Vo
(74) *Attorney, Agent, or Firm*—Eschweiler & Associates, LLC

(57) ABSTRACT

A load driver circuit includes an output transistor configured to drive a load. The circuit further includes a power supply, and a power supply evaluation circuit configured to sense a characteristic of the power supply, and generate a control signal in response thereto. In addition, a controller circuit is provided and is configured to drive the output transistor with a pulse width modulation signal coupled to the control terminal, wherein a duty cycle of the pulse width modulation signal is a function of the control signal of the power supply evaluation circuit.

24 Claims, 3 Drawing Sheets

AUTOMATIC PWM CONTROLLED DRIVER CIRCUIT AND METHOD

FIELD OF INVENTION

The present invention relates generally to a driver circuit and method, and more particularly relates to a circuit and method of driving a load via pulse width modulation, for example, in automotive type applications.

BACKGROUND OF THE INVENTION

Headlamps in automotive applications have increasingly become more sophisticated. For example, recently headlamps producing a continuously variable illumination range have become available. In this example the illumination range may be varied by one or both of changing the intensity of light and changing the direction of light emitted by the headlamps.

Varying headlamp illumination intensity can be accomplished in several different ways. One example is to provide a pulse width modulated (PWM) signal to the headlamp. By varying the duty cycle of headlamp power, the headlamp illumination intensity can be increased or decreased. This may be accomplished by providing a PWM signal from a control system to a high power field effect transistor (FET) in series with the headlamp bulb. Another headlamp control example involves providing a PWM signal to a lamp driver integrated circuit such as a Motorola (Freescale Semiconductor) MC33286. This integrated circuit provides some added advantages such as limiting a maximum in-rush current to the headlamp, thus potentially extending the life of the headlamp bulb.

There is a continued need for further improvements in automotive lighting control.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

According to one exemplary embodiment of the invention a load driver circuit is disclosed and comprises an output transistor configured to drive a load, and a power supply. The circuit further comprises a power supply evaluation circuit configured to sense a characteristic of the power supply and generate a control signal in response thereto. In addition, the circuit comprises a controller circuit configured to drive the output transistor with a pulse width modulation signal coupled to the control terminal, wherein a duty cycle of the pulse width modulation signal is a function of the control signal of the power supply evaluation circuit.

The following description and annexed drawings set forth in detail certain illustrative aspects and implementations of the invention. These are indicative of only a few of the various ways in which the principles of the invention may be employed.

DETAILED DESCRIPTION OF THE INVENTION

Figure 1:
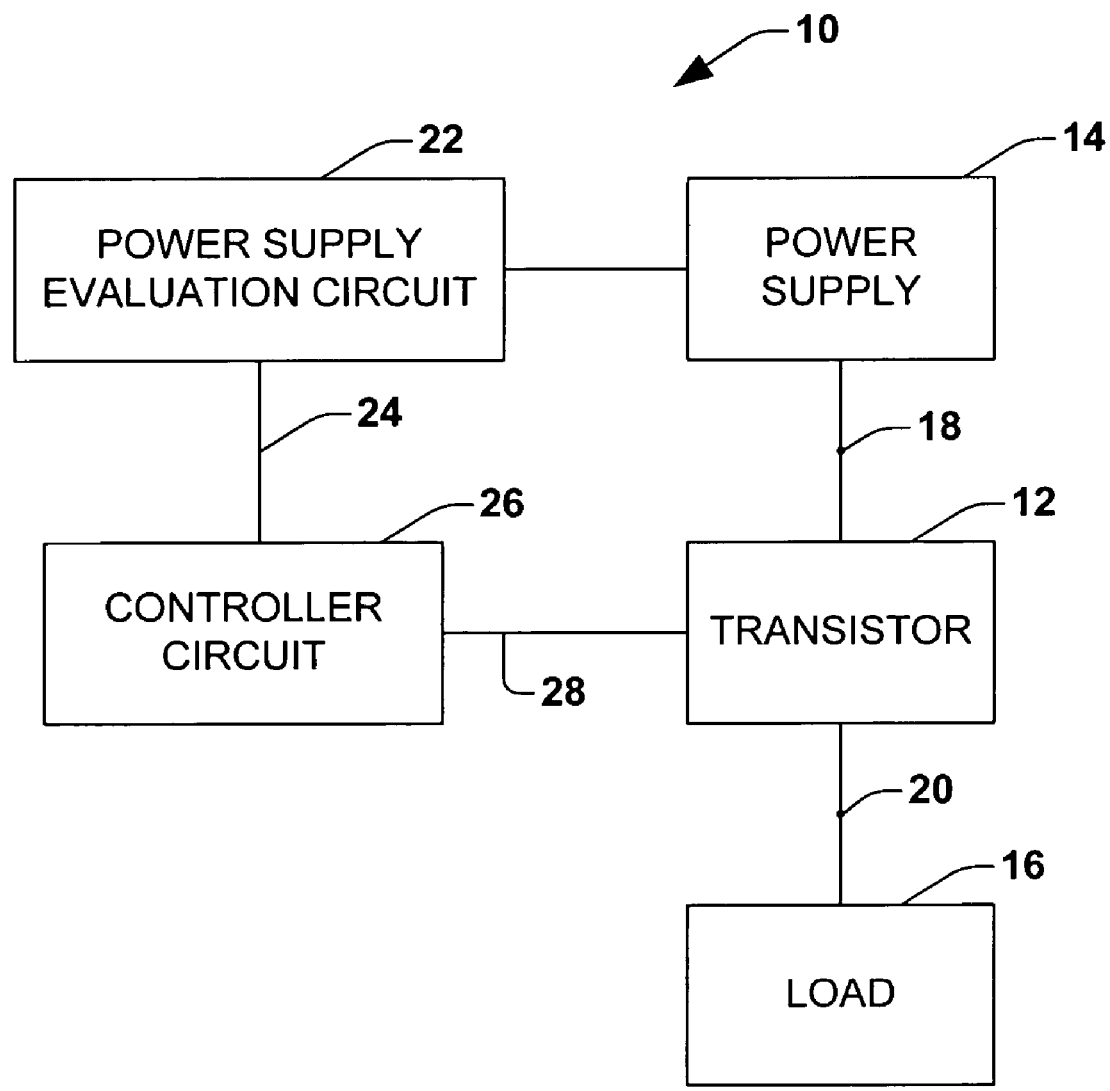
FIG. 1 is a block diagram illustrating a load driving system in accordance with one embodiment of the present invention.

One or more implementations of the present invention will now be described with reference to the attached drawings, wherein like reference numerals are used to refer to like elements throughout. The invention relates to system and method of driving loads such as exterior automotive headlamps in automotive systems.

FIG. 1 is a schematic diagram illustrating a load or other type load driver circuit 10 according to one exemplary aspect of the present invention. The driver circuit 10 includes an output transistor 12, for example, a power MOS device integrated into a semiconductor substrate. The transistor 12 is coupled between a power supply 14 such as a battery, and a load 16 such as an exterior automotive headlamp at first and second terminals 18, 20, respectively. Generally, a power supply evaluation circuit 22 is operably coupled to the power supply 14, for example, at terminal 18, and is configured to sense a characteristic of the power supply and generate a control signal 24 in response thereto. In addition, the driver circuit 10 comprises a controller circuit 26 that is configured to drive the output transistor 12 with a pulse width modulation (PWM) signal 28. Further, a duty cycle of the PWM signal 28 is a function of the control signal 24 from the power supply evaluation circuit 22.

In general, the driver circuit 10 operates to selectively limit an amount of average power delivered to the load 16. For example, under nominal conditions when the power supply voltage is within a prescribed acceptable range, for a given duty cycle, the power delivered to the load 16 will not exceed a predetermined, safe amount. However, under conditions where the power supply voltage exceeds a predetermined value or an average value over a predetermined period of time, for a given duty cycle, the output transistor 12 will deliver too much power to the load 16, that is more power than may be needed or desired for load reliability purposes. In such instances, according to one exemplary embodiment of the present invention, the power supply evaluation circuit 22 identifies a state of the power supply 14 that may lead to excessive undesired power transfer (e.g., an excessive voltage), and generates the control signal 24. The controller circuit 26 then reduces the duty cycle of the PWM signal 28 in response thereto, thereby reducing an amount of power delivered to the load 16. While a voltage magnitude is one exemplary state of the power supply that may be monitored according to the invention, it should be understood that other characteristics of the power supply 14 that may influence the power delivered to the load 16 may be monitored and/or evaluated and such alternative states are contemplated as falling within the scope of the present invention.

In accordance with another exemplary embodiment of the invention, an intelligent automotive lamp driver system 100 is disclosed. The system 100 is operable to drive automotive headlamps, for example, external headlamps as a load 116 with a switch 112 such as a power MOS transistor device. In accordance with one embodiment of the invention, the driver system components are all integrated onto a single integrated circuit chip and interface externally to the load 116 and an external power supply 114, such as an automotive battery, via terminals 118, 120, respectively. Alternatively, the invention may be provided in chip-by-chip, chip-on-chip, or other type implementations, and all such variations are contemplated as falling within the scope of the present invention.

Figure 2:
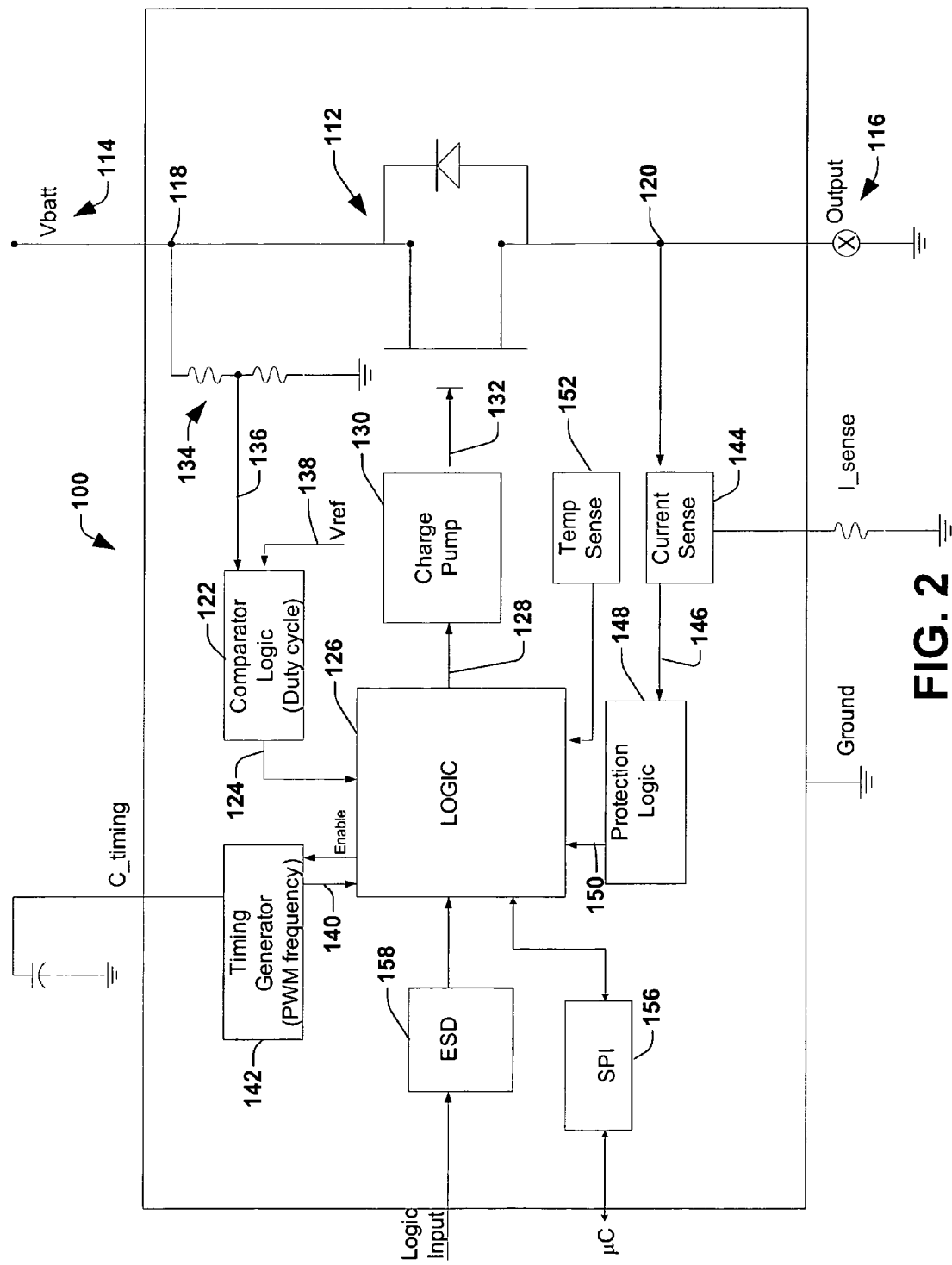
FIG. 2 is a schematic diagram illustrating a pulse width modulation driver circuit in accordance with one exemplary embodiment of the present invention.

In the example of FIG. 2, the switch 112 is controlled by a pulse width modulation signal 128 from a control circuit 126. In the above manner, an amount of power delivered to the load 116 may be varied, at least in one respect, by altering the duty cycle associated with the PWM signal 128. In the present example, the switch 112 is driven indirectly by the PWM signal 128 through a charge pump circuit 130 that operates to enable use of an N-channel FET for transistor 112 in a high side driver configuration. Alternatively, a P-channel FET may be employed, in which case no charge pump is necessary. Accordingly, the charge pump circuit 130 is optional.

The driver system 100 further includes a battery voltage detection circuit 122 that operates to monitor the battery 114 by, for example, monitoring a voltage magnitude of the battery directly or indirectly. In the present example, the battery voltage detection circuit 122 monitors a voltage associated with the battery (indirectly) by coupling to the battery 114 through a voltage divider circuit 134. In one exemplary embodiment, the battery voltage detection circuit comprises a comparator circuit, wherein a voltage 136 associated with the battery 114 is compared to a predetermined reference potential (e.g., Vref) 138. In this example, when the value at 136 exceeds the reference value at 138, the battery voltage is greater than a predetermined amount, and the comparator circuit switches states, thereby activating a control signal 124.

In the present example, the comparator 122 provides a single comparison and the output 124 reflects one of two available conditions of the battery (e.g., acceptable or unacceptable voltage). Alternatively, the battery voltage detection circuit 122 may be more sophisticated, for example, comparing the value to multiple thresholds, and/or providing the control signal 124 as an analog value that reflects a plurality of conditions, or as a multi-bit digital word that provides substantial resolution of information regarding a state of the battery. In yet another example, the evaluation circuit 122 may evaluate the voltage over a predetermined period of time and ascertain an average value during the time period and drive the control signal 124 based thereon.

The control circuit 126 receives the control signal 124 and generates a PWM signal 128 in response thereto. In one example, the control circuit 126 dictates an initial or default PWM condition based on a nominal duty cycle for normal operating conditions. For example, the control circuit 126 receives a reference frequency signal 140 from a timing generator 142 and, in conjunction with the signal 140, and initialization data, for example, in an on-board ROM cell or array, generates the initial PWM signal 128 with the nominal duty cycle associated therewith. Alternatively, the timing generator 142 may generate an initial PWM signal or modify an incoming signal from the "logic input."

When the control signal 124 changes state or otherwise indicates an adverse battery condition, the control circuit alters the PWM signal 128 accordingly. In one example, when the control signal 124 indicates that the battery voltage has exceeded a predetermined level, the control circuit 126 reduces the duty cycle of the PWM signal 128 to thereby reduce an amount of power delivered to the load 116 via the switch 112. The control unit 126 may operate in various different modes in accordance with the present invention. For example, based on a change of state in the control signal 124, the control unit 126 may reduce the duty cycle of the PWM signal 128 to a reduced predetermined value. Alternatively, a value associated with the control signal 124 may be employed by the control circuit 126 to reduce the duty cycle of the PWM signal 128 by a calculated amount, for example, according to a predetermined algorithm or via a look-up table. In the above manner, the actual value of the battery voltage may be used to tailor the PWM signal 128 to thereby ensure the power delivered to the headlamp load 116 does not exceed a predetermined amount.

In one rudimentary example of one embodiment of FIG. 2, an automotive application is provided, wherein it is determined that if the automotive battery voltage exceeds 13.7 volts, a reliability issue may arise in that excessive power may be delivered to the exterior headlamps of the vehicle, thereby causing such headlamps to burn out prematurely. It has been found that in some automotive applications having many power motors (e.g., power seats, doors, etc.) the actuation of such motors can cause inductive flyback, wherein energy therefrom is diverted back to the automotive battery, causing the voltage thereof to increase.

When the automotive battery voltage exceeds a predetermined value the voltage 136 at the voltage divider 134 (that is associated with the battery voltage) exceeds a predetermined threshold, which in this example is the Vref voltage 138. This condition, in this example, trips the comparator 122, causing the state of the control signal 124 to change (e.g., change from low to high). The control circuit 126 detects the change of state in the control signal 124 and reduces the duty cycle of the PWM signal 128 that is then passed to the power MOS transistor 112 by the charge pump 130. The transmitted PWM signal 132 then drives the power MOS transistor 112, in this example, which results in the power delivered to the automotive headlamp 116 being reduced.

In accordance with another embodiment of the invention, automotive lamp driver system 100 of FIG. 2 may further comprise protection circuitry such as an over-current sense circuit 144 configured to sense a current (e.g., I_sense) associated with the load 116, and generate a signal 146 associated therewith. The signal 146 may, in one example, be evaluated or otherwise processed by a protection logic circuit 148 that is configured to generate a safety cut-off signal, for example, if the load current reaches a dangerous level. In such an instance the protection logic circuit 148 provides a signal 150 to the control circuit to indicate that the power should be cut-off entirely or reduced, for example, via a reduction in the duty cycle of the PWM signal 128.

In addition, the driver system 100 may further include a thermal sense circuit 152 that is configured to sense thermal conditions associated therewith. For example, if the temperature of the power MOS transistor 112 exceeds a predetermined amount, the thermal sense circuit 152 outputs a thermal shut-off signal 154 to the control circuit 126 to dictate a shut-off of the output transistor 112 (e.g., the duty cycle being lowered to 0%).

The control circuit 126, in accordance with another embodiment of the present invention, is operable to communicate a status of the driver system 100 to a central automotive microcontroller through an SPI interface 156, for example. In such an example, the control circuit 126 may communicate the present duty cycle of the PWM signal 128, the current (I_sense) associated with the load 116, or the thermal conditions as reported by the temperature sense circuit 152. Furthermore, in one example, the interface link is bidirectional, wherein the microcontroller can provide data to the control circuit 126 to alter one or more predetermined thresholds, initialization variables, duty cycle alteration algorithms, look-up tables, etc. Lastly, the control circuit 126 may be accessed via external logic circuitry through, for example, electrostatic discharge (ESD) circuitry 158 to prevent damage thereto.

Figure 3:
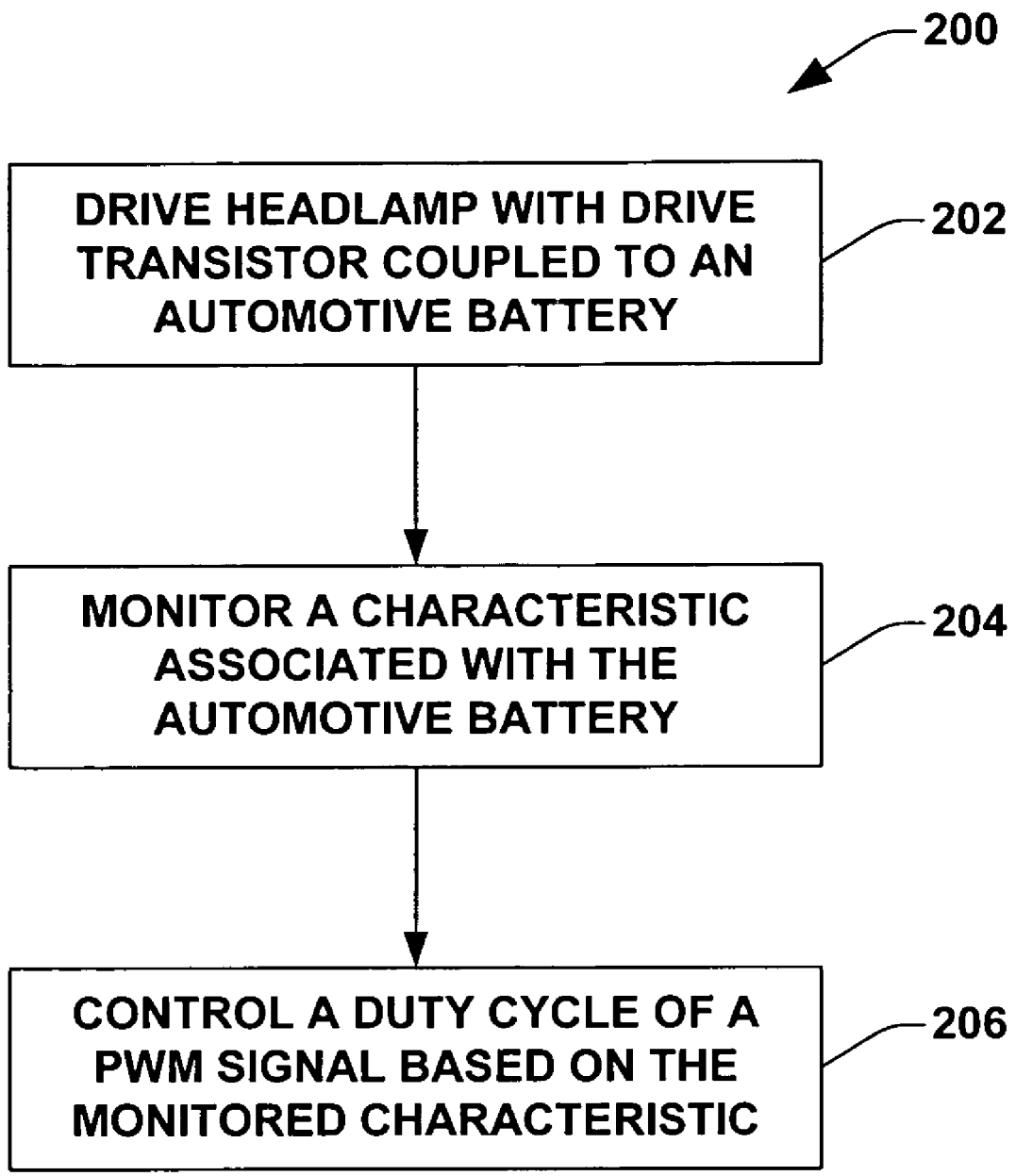
FIG. 3 is a flow chart diagram illustrating a method of driving an automotive headlamp in accordance with yet another embodiment of the invention.

According to still another embodiment of the present invention, a method of driving an automotive headlamp in an automotive application, for example, is provided. Turning now to FIG. 3, a method 200 of driving the automotive headlamp is provided. Although the method 200 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods of the present invention may be implemented in association with various types of automotive driver components and systems, and any such system or group of components, either hardware and/or software, incorporating such a method is contemplated as falling within the scope of the present invention.

The method 200 begins at 202 with driving an exterior automotive headlamp with a drive transistor powered by an automotive battery. The driving of the headlamp at the load may be performed, in accordance with one example, with an initial PWM signal having a predetermined duty cycle. A characteristic associated with the battery is then monitored at 204 while the load is driven by the transistor. In one example, the battery characteristic being monitored is the battery voltage, although other characteristics may be monitored and are contemplated as falling within the scope of the present invention.

The method 200 of FIG. 3 continues at 206, wherein a duty cycle of the PWM signal driving the transistor is controlled based on the monitored characteristic. In one example, the duty cycle is varied so that a power delivered to the exterior headlamp does not exceed a predetermined amount. For example, when a voltage associated with the automotive battery exceeds a predetermined threshold, the duty cycle of the PWM signal is reduced, thus reducing the power delivered to the load. Alternatively, at lower battery voltages the duty cycle may be increased.

The method 200 may further control the duty cycle of the PWM signal based on other monitored characteristics that may not be associated with the automotive battery. For example, a thermal condition of the drive transistor may be monitored and the duty cycle may be reduced if the temperature exceeds some predetermined threshold. Alternatively, a load current associated with the headlamp may be monitored and the duty cycle may be varied (e.g., altered to 0%, thereby shutting the transistor off) if a detected current exceeds a predetermined threshold.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A load driver circuit, comprising:
   an output transistor configured to drive an automotive lamp load, having a first terminal configured to be coupled to a power supply, a second terminal configured to be coupled to the load, and a control terminal;
   a power supply evaluation circuit configured to sense a characteristic of the power supply when coupled thereto, and generate a control signal in response thereto;
   a controller circuit configured to drive the output transistor with a pulse width modulation signal coupled to the control terminal, wherein a duty cycle of the pulse width modulation signal is a function of the control signal of the power supply evaluation circuit; and
   an interface configured to communicate between the controller circuit and a central automotive controller.

2. The driver circuit of claim 1, wherein the automotive lamp load comprises an automotive headlamp.

3. The driver circuit of claim 1, wherein the power supply comprises an automotive battery.

4. The driver circuit of claim 1, wherein the load comprises an exterior automotive light bulb.

5. The driver circuit of claim 1, wherein the interface is operable to communicate a status of the driver circuit to the central automotive controller, and to communicate data from the central automotive controller to the controller circuit.

6. The driver circuit of claim 1, wherein the interface comprises a serial peripheral interface configured to serially communicate bidirectionally between the driver circuit and the central automotive controller.

7. The driver circuit of claim 1, wherein the interface is configured to communicate a status of the driver circuit to the central automotive controller.

8. The driver circuit of claim 1, wherein the interface is configured to communicate data from the central automotive controller to the control circuit to alter one or more of a predetermined threshold, initialization variable, duty cycle alteration algorithm, and look-up table.

9. The driver circuit of claim 1, wherein the power supply characteristic comprises a voltage magnitude.

10. The driver circuit of claim 9, wherein the controller circuit is configured to reduce a duty cycle of the pulse width modulation signal when the voltage magnitude exceeds a predetermined magnitude threshold.

11. The driver circuit of claim 1, wherein the controller circuit further comprises
   a temperature sense circuit configured to sense a temperature of the driver circuit, and an over-current sense circuit configured to sense an over-current condition of the load.

12. The driver circuit of claim 11, wherein the controller circuit is configured to communicate a thermal condition of the output transistor, and an over-current condition of the load to the central automotive controller by way of the interface.

13. A pulse width modulation driver system, comprising:
a power transistor comprising a first terminal configured to couple to a battery, a second terminal configured to couple to a light bulb, and a control terminal;
a battery evaluation circuit configured to monitor a state of the battery, and generate a control signal in response thereto;
a controller circuit configured to drive the control terminal of the power transistor with a pulse width modulation signal having a duty cycle that is a function of the control signal of the battery evaluation circuit; and
a peripheral interface configured to communicate between the controller circuit and a central automotive microcontroller, wherein the interface is operable to communicate a status of the driver system to the central automotive microcontroller, and to communicate data from the central automotive microcontroller to the controller circuit.

14. The driver system of claim 13, wherein the battery comprises an automotive battery.

15. The driver system of claim 13, wherein the light bulb comprises an exterior automotive light bulb.

16. The driver circuit of claim 13, wherein the interface comprises a serial peripheral interface configured to serially communicate bidirectionally between the driver system and the central automotive microcontroller.

17. The driver circuit of claim 13, wherein the interface is configured to communicate a status of the driver system to the central automotive microcontroller.

18. The driver circuit of claim 13, wherein the interface is configured to communicate data from the microcontroller to the control circuit to alter one or more of a predetermined threshold, initialization variable, duty cycle alteration algorithm, and look-up table.

19. The pulse width modulation driver system of claim 13, wherein the battery evaluation circuit comprises a comparator circuit configured to compare a signal associated with the battery to a reference signal, and generate the control signal in response to the comparison.

20. The pulse width modulation driver system of claim 19, wherein the controller circuit is configured to provide an initial duty cycle if the signal associated with the battery is less than the reference signal, and a subsequent, different duty cycle if the signal associated with the battery is greater than the reference signal, wherein the second duty cycle is less than the first duty cycle, thereby reducing an average power delivered to the light bulb, wherein the signal associated with the battery is greater than the reference signal.

21. The pulse width modulation driver system of claim 13, wherein the battery evaluation circuit is configured to ascertain a magnitude of a voltage associated with the battery, and the controller circuit is configured to vary the duty cycle of the pulse width modulation signal in response thereto.

22. The pulse width modulation driver system of claim 21, wherein the controller circuit is configured to decrease the duty cycle of the pulse width modulation signal when the magnitude of the battery voltage increases.

23. The driver circuit of claim 13, wherein the controller circuit further comprises
a temperature sense circuit configured to sense a temperature of the output transistor, and
an over-current sense circuit configured to sense an over-current condition of the load.

24. The driver circuit of claim 23, wherein the controller circuit is configured to communicate a thermal condition of the driver transistor, and an over-current condition of the load to the central automotive microcontroller by way of the interface.

* * * * *